United States Patent [19]

Steele

[11] Patent Number: 4,683,509

[45] Date of Patent: Jul. 28, 1987

[54] HIGH EFFICIENCY MAGNETIC ERASE HEAD

[75] Inventor: Bruce L. Steele, Rancho California, Calif.

[73] Assignee: Odetics, Inc., Anaheim, Calif.

[21] Appl. No.: 621,230

[22] Filed: Jun. 15, 1984

[51] Int. Cl.[4] .......................... G11B 5/23; G11B 5/325
[52] U.S. Cl. ..................... 360/119; 360/118; 360/125
[58] Field of Search ................... 360/118, 119–120, 360/121, 125–127, 113, 66

[56] References Cited

U.S. PATENT DOCUMENTS

| 3,102,170 | 8/1983 | Koning | 360/118 |
| 3,681,526 | 8/1972 | Camras | 360/66 X |
| 3,827,083 | 7/1974 | Hosaka et al. | 360/118 X |
| 4,400,753 | 8/1983 | Chabrolle | 360/119 X |

FOREIGN PATENT DOCUMENTS 0040326 10/1978 Japan ..................... 360/121
0080817 7/1981 Japan ..................... 360/121

Primary Examiner—John H. Wolff
Assistant Examiner—David J. Severin
Attorney, Agent, or Firm—Spensley Horn Jubas & Lubitz

[57] ABSTRACT

In a magnetic transducer of the type including a pair of opposed, generally C-shaped pole pieces positioned in facing relationship with a gap between first ends of the pole pieces, each pole piece being formed from a ferrite material and having a coil would therearound, and at least one length of conductive gap material positioned within the gap so as to shunt the magnetic lines of flux flowing through the pole pieces into a magnetic recording medium which engages the pole pieces in the area of the gap, there is disclosed an improved erase head wherein an elongate bar made from a conductive material is positioned between the pole pieces, in the cavity therebetween, parallel thereto and to the gap and spaced from the gap.

7 Claims, 3 Drawing Figures

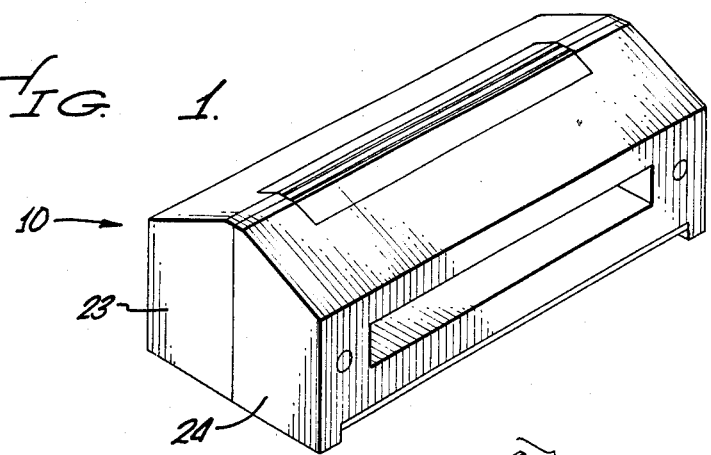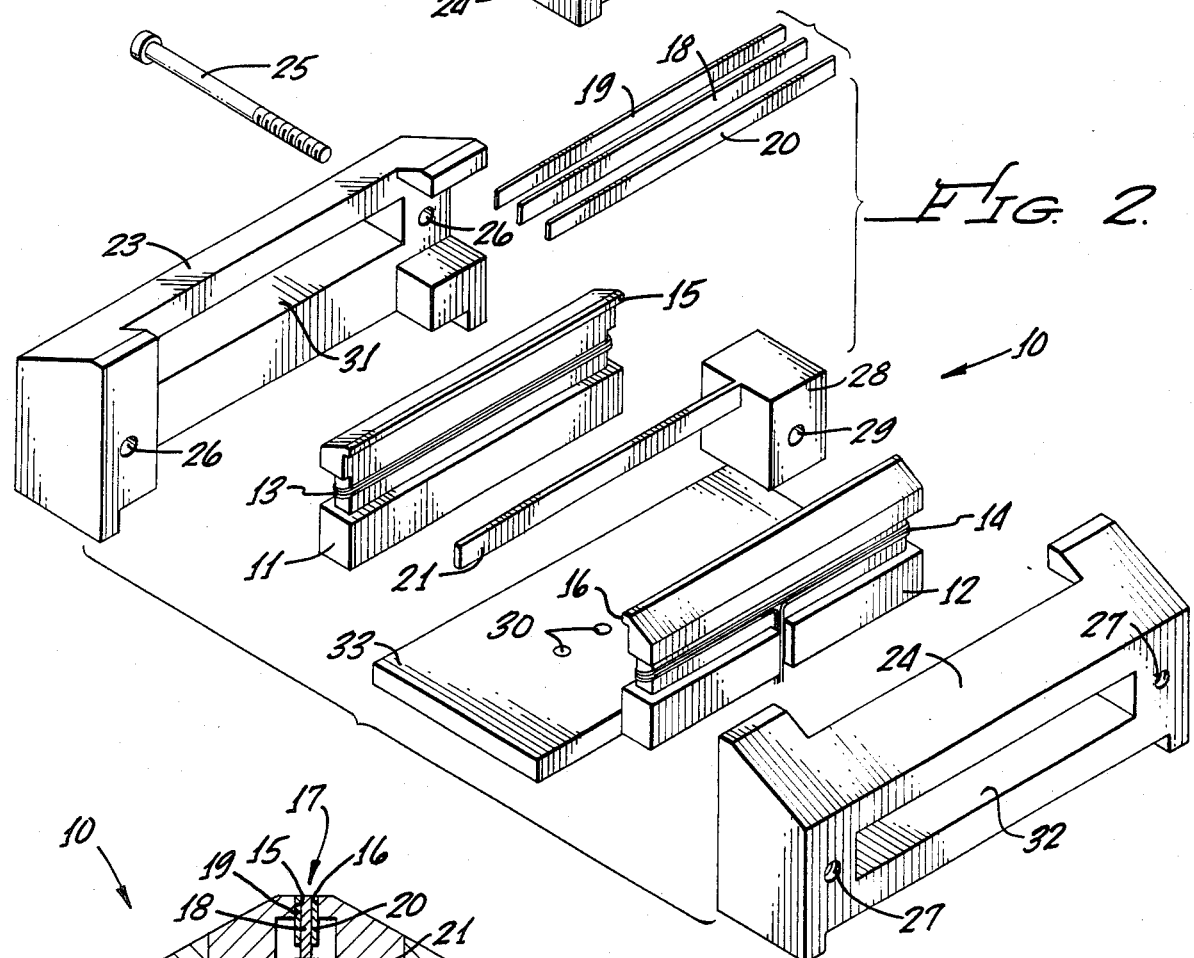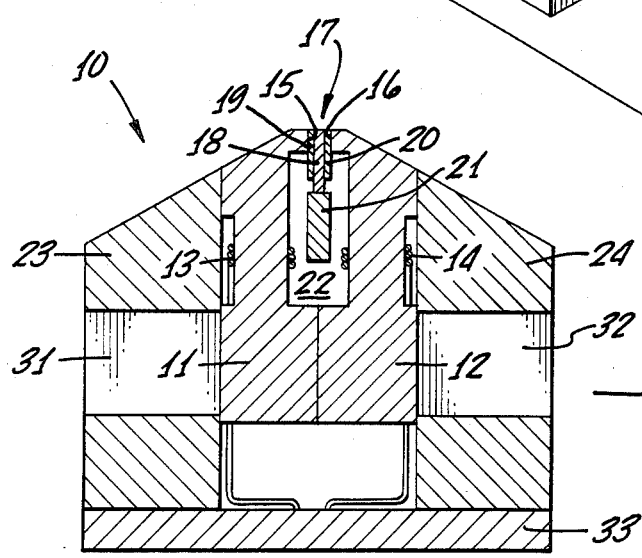

HIGH EFFICIENCY MAGNETIC ERASE HEAD

BACKGROUND OF THE INVENTION

1. Field of the Invention

The present invention relates to a high efficiency erase head and, more particularly, to an AC erase head which requires considerably less power to erase long wavelength signals from magnetic tape than similar erase heads used heretofore.

2. Description of the Prior Art

One of the single most important parts of a magnetic tape recording and playback system is the transducer which converts electrical signals to magnetic signals and back to electrical signals. These transducers are typically referred to as "heads". Heads are used for recording information on magnetic tape, reading information from magnetic tape and erasing prerecorded signals on magnetic tape. The present invention is con- concerned with the problems associated with erase heads.

There are a number of different types of magnetic heads that have been developed for use as an erase head in an instrumentation magnetic recording system. One commonly used type includes a pair of opposed, generally C-shaped pole pieces positioned in facing relationship, with a gap between first ends of the pole pieces, each pole piece being formed from a ferrite material and having a coil wound therearound. A conductive gap material is bonded on opposite sides of a ferrite gap spacer and this subassembly (the gap spacer with the gap material on opposite sides thereof) is placed between the first ends of the pole pieces. The other ends of the pole pieces are in contact with each other to complete the path for the magnetic lines of flux. The two pole pieces are then bonded together by injecting a potting compound into the inner cavity. The completed assembly forms a ferrite core module which is then inserted between metal half brackets which are secured together by retaining screws. Additional potting compound is typically injected into cavities in each half bracket to better secure the ferrite core module therein. It should be observed that only the ferrite core module concerns itself with the erasure of magnetic tape and the metal half brackets serve as a means of support and provide mounting capability for the head.

When a high frequency alternating current is applied to the windings on the ferrite pole pieces, a magnetic field is set up such as to cause flux to flow easily through the high permeability pole pieces. The non-magnetic, conductive gap material on the opposite sides of the gap spacer begin to generate eddy currents which oppose the flux path from one pole piece to the other. The result is that the flux at the gaps is shunted upwardly into the tape and principles of recording or erasure take place. In the above described construction, there are two gaps which conduct flux into the tape although a single gap or three or more gaps can be used.

AC erase heads require considerably more power to erase long wavelength signals from magnetic tape than do record heads which record similar wavelengths on the tape. As a result, a highly efficient AC erase head will attempt to insure confinement of the flux lines through the core structure to the gap area where they are shunted upwardly into the magnetic tape. In spite of previous attempts to increase the efficiency of AC erase heads, considerable power is typically required. This presents at least two problems. The first is the necessity to provide the power and the second is that the applied power causes heating of the erase head and the necessity of finding a means for dissipating such heat.

SUMMARY OF THE INVENTION

According to the present invention, these problems are solved by the provision of a high efficiency magnetic erase head which requires significantly less power to erase given wavelengths on magnetic tape than does a conventional style erase head. Tests performed with the present invention have shown that from one-half to one-third of the power previously required is now required for erasure of long wavelengths utilizing the teachings of the present invention. By increasing the efficiency of an AC erase head by two to three times and more, significantly less power is required and the problems associated with heating of AC erase heads are simultaneously reduced.

Briefly, in a magnetic transducer of the type including a pair of opposed, generally C-shaped pole pieces positioned in facing relationship with a gap between first ends of the pole pieces, each pole piece being formed from a ferrite material and having a coil wound therearound, and at least one length of conductive gap material positioned within the gap so as to shunt the magnetic lines of flux flowing through the pole pieces into a magnetic recording medium which engages the pole pieces in the area of the gap, the present invention comprises an elongate bar made from a conductive material positioned between the pole pieces, parallel thereto and to the gap, and spaced from the gap. Where the gap material is bonded to opposite sides of a ferrite gap spacer to provide a double gap configuration, the elongate bar is connected to the ferrite gap spacer, spaced from the gap material.

The conductive bar, like the conductive gap or gaps, will generate eddy currents when subjected to an alternating magnetic field set up in the ferrite pole pieces. These eddy currents appear to oppose flux leakage from one pole piece to the other and also the downward shunting effect at the gap region. Thus, the addition of the conductive bar appears to insure confinement of the flux lines through the core structure to the gap area and the upward shunting of the flux lines into the magnetic tape. With more flux confinement and upward shunting of flux into the tape, less power is required to drive the erase head.

OBJECTS, FEATURES AND ADVANTAGES

It is therefore the object of the present invention to solve the problems associated with the power and heat dissipation requirements of an AC erase head. It is a feature of the present invention to solve these problems by the provision of a highly efficient AC erase head. An advantage is an erase head which requires significantly less power. A further advantage is an AC erase head which heats up significantly less. A still further advantage is an AC erase head which minimizes flux leakage and concentrates flux at the erase gap.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

BRIEF DESCRIPTION OF THE DRAWINGS

FIG. 1 is a perspective view of an AC erase head constructed in accordance with the teachings of the present invention;

FIG. 2 is an exploded perspective view thereof; and

FIG. 3 is a cross-sectional view of the embodiment shown in FIG. 1

DESCRIPTION OF THE PREFERRED EMBODIMENTS

Referring now to the drawings, there is shown a generally conventional AC erase head, generally designated 10, modified in accordance with the teachings of the present invention. More specifically, head 10 includes a pair of opposed, generally C-shaped pole pieces 11 and 12. Pole pieces 11 and 12 are both made from a ferrite material and have coils 13 and 14, respectively, wound around the central portions thereof. The lower ends (as viewed in FIG. 3) of pole pieces 11 and 12 contact each other to provide a continuous path for the lines of flux generated therein. The edge faces 15 and 16 at the upper ends of pole pieces 11 and 12, respectively, are spaced from each other to form a gap 17.

Positioned within gap 17 is an elongate gap spacer 18 made from a ferrite material. Gap spacer 18 extends through the entire length of pole pieces 11 and 12. Bonded to the opposite sides of gap spacer 18 are first and second lengths of gap material 19 and 20. Gap material 19 and 20 is made from a nonferrite, conductive material such as copper.

According to the present invention, an elongate bar 21 made from a conductive material, such as copper, is positioned between pole pieces 11 and 12, parallel thereto and to gap 17, spaced below gap 17, and electrically insulated from gap material 19 and 20. According to the embodiment of FIGS. 1-3, gap material 19 and 20 is bonded to the opposite sides of gap spacer 18, adjacent the top edge thereof, and the bottom edge thereof is bonded to the top edge of bar 21. It should be noted that the conductive gap material 19 and 20 is not shorted to conductive bar 21. This subassembly (gap spacer 18, gap material 19 and 20 and conductive bar 21) is then placed between pole pieces 11 and 12 with gap material 19 and 20 contacting faces 15 and 16, respectively, of pole pieces 11 and 12, respectively. Pole pieces 11 and 12 are then bonded together, typically by injecting a potting compound into inner cavity 22 (where conductive bar 21 is located), and lapped and polished.

This module, generally referred to as the ferrite core module, is then inserted between a pair of metal, slotted half brackets 23 and 24 which are secured together by retaining screws 25. Screws 25 extend through holes 26 in half bracket 23 and engage threaded holes 27 in half bracket 24. It should be noted that one end of conductive bar 21 is preferably secured to a base 28 having a hole 29 therein. When bar 21 is positioned between pole pieces 11 and 12, base 28 is positioned along first ends of pole pieces 11 and 12 and extends into mating cavities in half brackets 23 and 24. One of screws 25 extends through hole 29 in base 28 as a support member. Additional potting compound is then typically injected into cavities 31 and 32 in half brackets 23 and 24, respectively, to better secure the ferrite core module within. The four ends of coils 13 and 14 are connected to terminals 30 on a terminal board 33 which forms the bottom of head 10.

It should be noted that only the ferrite core module concerns itself with the erasure of magnetic tape and that metal brackets 23 and 24 merely serve as means of support and provide mounting capability to permit head 10 to be mounted to a tape deck. The ferrite core module sits high enough above brackets 23 and 24 to insure intimate contact of gap material to magnetic tape.

All of the subassembly components and the assembly thereof are well known to those skilled in the art with the exception of the inclusion of conductive bar 21 and its placement in the ferrite core module with respect to pole pieces 11 and 12, gap spacer 18 and gap material 19 and 20.

In operation, when a high frequency alternating current is applied to coils 13 and 14 on pole pieces 11 and 12, respectively, a magnetic field is set up such as to cause flux to flow easily through the high permeability pole piece structure. The non-magnetic, conductive gap material 19 and 20 begins to generate eddy currents which oppose the flux path from ferrite pole piece 11 to gap spacer 18 and then to pole piece 12. As a result, the flux at the gaps (gap 17 is, in this embodiment, actually two gaps) is shunted upwardly into the tape which passes in intimate contact with the upper end of erase head 10. Thus, the principles of erasure take place.

It should be noted that the flux is not normally entirely confined to the magnetic path just described. Some of the flux lines will shunt across the inner cavity 22 separating pole pieces 11 and 12 and downwardly from the gap area as well.

A highly efficient erase head will attempt to insure confinement of the flux lines through pole pieces 11 and 12 to the area of gap 17 whereby they are shunted upwardly into the magnetic tape. This is what is achieved by the present invention which minimizes flux leakage and concentrates the flux at the top of gap 17.

That is, it is believed that by introducing conductive bar 21 into cavity 22, bar 21, like the conductive gaps, will generate eddy currents when subjected to an alternating magnetic field set up in pole pieces 11 and 12. These eddy currents will oppose flux leakage from one pole piece to the other and also the downward shunting effect at the region of gap 17. With more flux confinement and upward shunting of flux into the tape, less power is required to drive erase head 10.

Tests have shown that one-half to one-third of the power is required for erasure of long wavelengths when conductive bar 21 is added as compared to the power required without bar 21. Furthermore, static measurements made on erase head 10 differ from those made on erase heads without bar 21. Full winding to half winding inductance ratios approach a four to one ratio on heads without bar 21 and are only approximately 2.5 to 1 with head 10. This lower inductance may explain why less power is required.

The embodiment of FIGS. 1-3 shows a single gap spacer 18 having gap material 19 and 20 on opposite sides thereof to form an erase head with two gaps. However, the present invention is equally applicable to an erase head with one gap or with three or more gaps. In an erase head with only a single gap, gap spacer 18 would not be used and only a length of gap material would be positioned between faces 15 and 16. With three or more gaps, multiple gap spacers 18 would be used in parallel, spaced relationship with lengths of gap material therebetween. In any event, conductive bar 21 will be positioned within cavity 22 and positioned as shown.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A magnetic transducer capable of diverting magnetic flux flowing therein toward an adjacent magnetic media comprising:
    first and second pole pieces made of ferrite material and respectively having end faces spaced apart to define a gap therebetween above which said magnetic media may be located;
    a first conductive gap material positioned in said gap between said end faces such that an alternating magnetic flux flow between said faces will induce a first eddy current in said first conductive gap material and thereby inhibit said alternating magnetic flux from flowing through said first conductive gap material;
    a conductive bar insulated electrically from said first conductive gap material and positioned below said gap such that a portion of said alternating magnetic flux flowing below said gap, through said conductive bar, will induce a second eddy current therein and thereby inhibit said portion of said alternating magnetic flux from flowing below said gap; said first conductive gap material and said conductive bar thus diverting magnetic flux to flow above said gap; and
    a gap spacer made of ferrite material positioned in said gap between said end faces,
    wherein said conductive bar is bonded to said gap spacer.

2. A magnetic transducer according to claim 1 wherein said gap spacer is bonded to said first conductive gap material.

3. A magnetic transducer according to claim 1 wherein said conductive bar is secured to a base for positioning said conductive bar below said gap.

4. A magnetic transducer according to claim 1 wherein said first conductive gap material is bonded to a first side of said gap spacer and a second conductive gap material positioned in said gap is bonded to a second side of said gap spacer.

5. A magnetic transducer according to claim 4 wherein said first and second pole pieces are generally C-shaped and their respective end faces contact said first and second conductive gap materials respectively.

6. A magnetic transducer according to claim 1 wherein said conductive bar extends parallel to the end faces defining said gap.

7. A magnetic transducer according to claim 6 wherein said end faces are elongated and said conductive bar extends the full length of said end faces.

* * * * *